United States Patent [19]
Ilcisin et al.

[11] Patent Number: 5,528,109
[45] Date of Patent: Jun. 18, 1996

[54] ADDRESSING STRUCTURE USING IONIZABLE GASEOUS MIXTURE HAVING DECREASED DECAY TIME

[75] Inventors: Kevin J. Ilcisin, Beaverton, Oreg.; Paul C. Martin, Vancouver, Wash.; Thomas S. Buzak, Beaverton, Oreg.

[73] Assignee: Tektronix, Inc., Wilsonville, Oreg.

[21] Appl. No.: 424,697

[22] Filed: Apr. 19, 1995

[51] Int. Cl.$^6$ .................................................. G09G 3/10
[52] U.S. Cl. .................................. 315/169.4; 315/169.1; 313/582; 313/584; 313/643
[58] Field of Search .......................... 315/169.1, 169.4; 313/582, 584, 643; 345/60–72

[56] References Cited

U.S. PATENT DOCUMENTS

| | | | |
|---|---|---|---|
| 2,847,615 | 8/1958 | Englebart | 315/84.6 |
| 4,027,195 | 5/1977 | Shutoh et al. | 315/169 |
| 4,352,101 | 9/1982 | De Jule | 340/769 |
| 4,896,149 | 1/1990 | Buzak et al. | 340/794 |
| 5,077,553 | 12/1991 | Buzak | 340/794 |
| 5,300,859 | 4/1994 | Yatsiv et al. | 315/248 X |
| 5,420,707 | 5/1995 | Miyazaki | 315/169.4 X |
| 5,440,201 | 8/1995 | Martin et al. | 315/169.4 X |
| 5,446,344 | 8/1995 | Kanazawa | 315/169.4 |
| 5,453,660 | 9/1995 | Martin et al. | 315/169.4 X |
| 5,455,489 | 10/1995 | Bhargava | 315/169.4 |

FOREIGN PATENT DOCUMENTS

| | | |
|---|---|---|
| 47128450 | 8/1974 | Japan . |
| 54-58247 | 5/1979 | Japan . |

*Primary Examiner*—Robert Pascal
*Assistant Examiner*—Haissa Philogene
*Attorney, Agent, or Firm*—Paul S. Angello

[57] ABSTRACT

An addressing structure uses an ionizable gaseous mixture having a decreased decay time to address data storage elements (16) defined by the overlapping areas of multiple column electrodes (18) on a first substrate (48) and multiple channels (20) on a second substrate (54). Each of the channels contains the ionizable gaseous mixture and includes a reference potential electrode that receives a data signal and a row electrode that receives a data strobe signal. The ionizable gaseous mixture contains an ionizable gaseous medium and ionized particles that are collisionally matched with the ionizable gaseous medium to produce an decreased decay time of the ionizable gaseous mixture. The decreased decay time of the ionizable gaseous mixture provides an addressing structure having high-speed addressing capabilities.

14 Claims, 9 Drawing Sheets

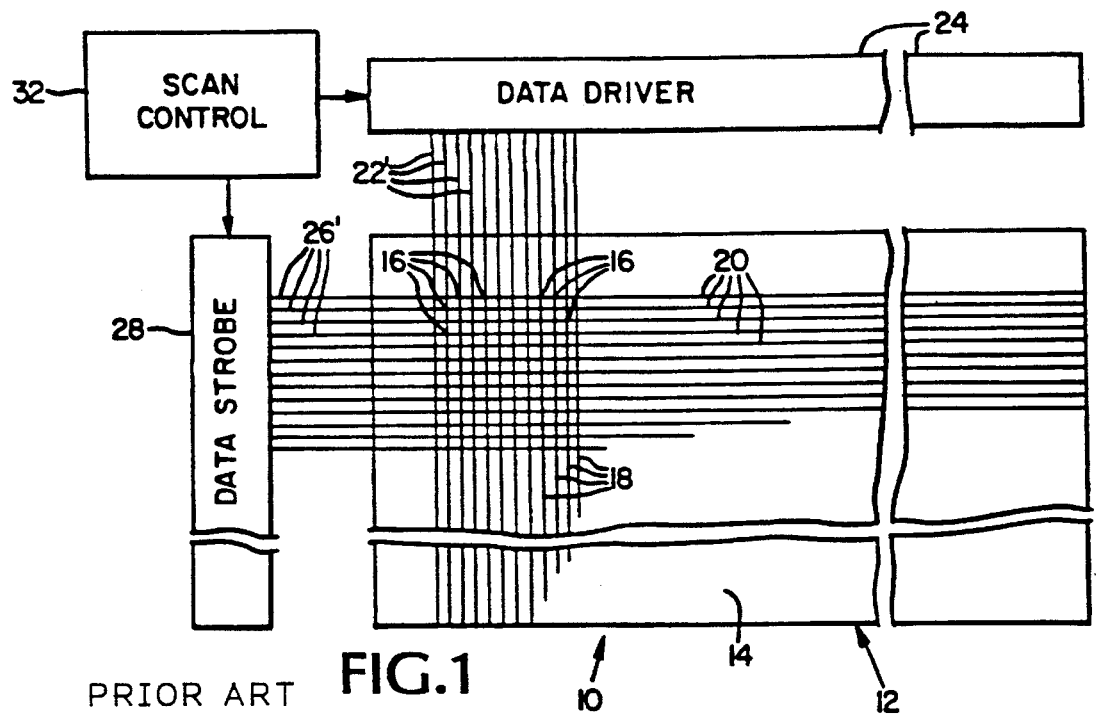
PRIOR ART FIG.1
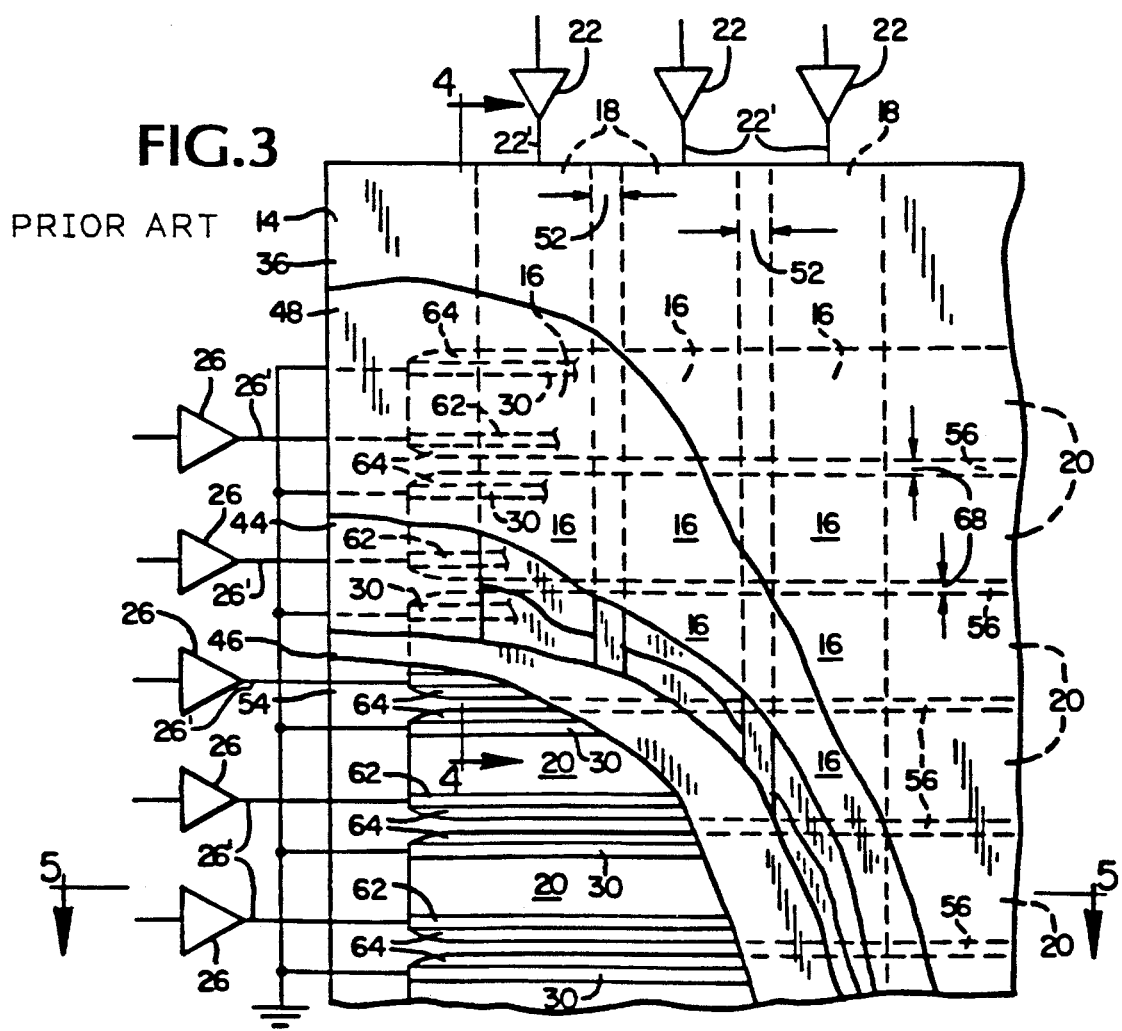
FIG.3
PRIOR ART

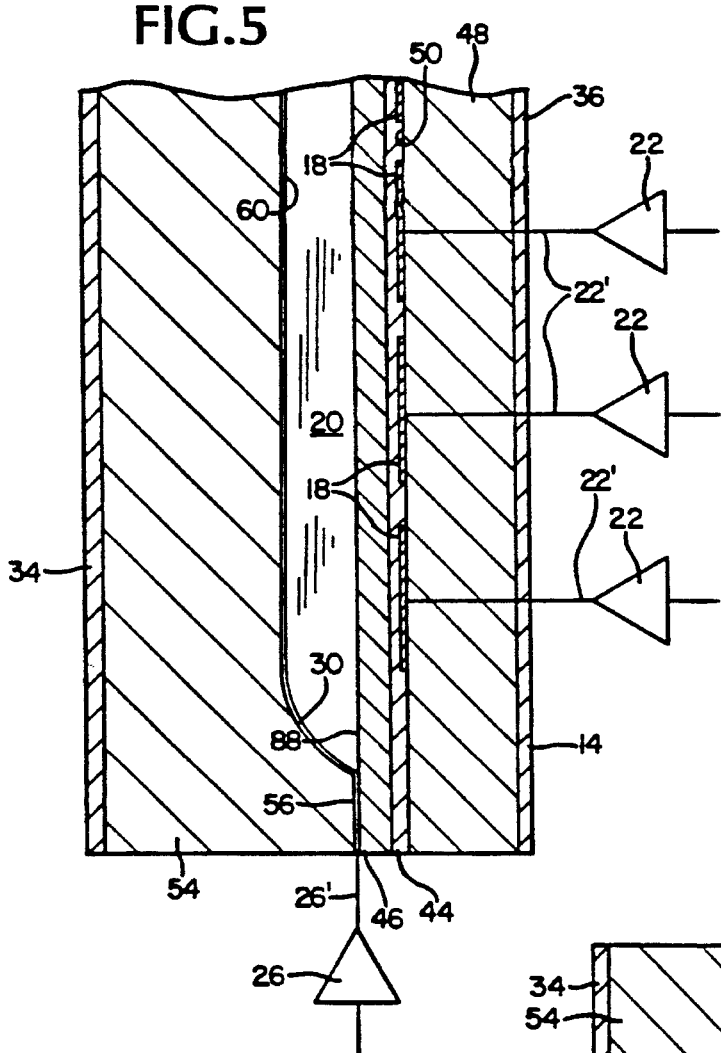
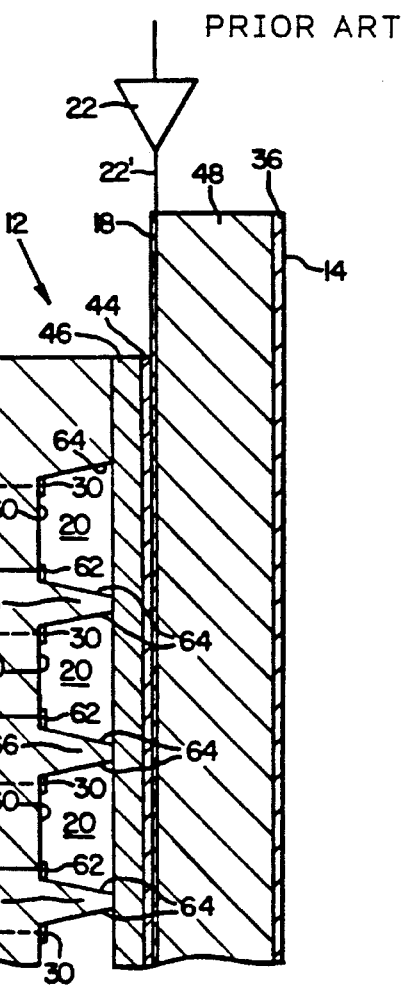

ADDRESSING STRUCTURE USING IONIZABLE GASEOUS MIXTURE HAVING DECREASED DECAY TIME

TECHNICAL FIELD

The present invention relates to systems constructed of data storage elements and, in particular, to apparatus for and methods of addressing an array of such storage elements with the use of an ionizable gaseous mixture having a decreased decay time.

BACKGROUND OF THE INVENTION

Systems employing data storage elements include, for example, video cameras and image displays. Such systems employ an addressing structure that provides data to or retrieves data from the storage elements. One system of this type to which one embodiment of the present invention is particularly directed is a general purpose flat panel display, whose storage or display elements store light pattern data.

A flat panel display comprises multiple display elements distributed throughout the viewing area of a display surface. A flat panel display system is desirable because it does not necessarily require a cathode-ray tube to develop a display image. A cathode-ray tube is undesirable because of its size, fragility, and need for high voltage drive circuitry.

One type of flat panel display system employs an addressing structure that accomplishes direct multiplexing of multiple liquid crystal cells or display elements arranged in an array. Each of the liquid crystal cells is positioned between a pair of electrical conductors that selectively apply select and deselect voltage signals across the liquid crystal cell to change its optical properties and thereby change the brightness of the image it develops. The select and deselect voltage signals are applied to the liquid crystal display by use of an ionizable gas contained within an enclosed volume, the gas functioning as an electrical switch that changes between a conducting state when it is ionized and a nonconducting state when it is nonionized.

The addressability of the liquid crystal display panel, i.e., the number of horizontal lines that can be addressed in a single frame time, is determined by the sum of the data set up time, the data capture time, and the ionizable gas decay time. The decay time, defined as the time the ionizable gas takes to change from the ionized conductive state to the nonionized nonconductive state, should generally be less than half the horizontal line address period to allow for cross-talk compensation. At a minimum, the decay time should be less than one horizontal line address time. For a 60 Hz frame rate, this implies an ionizable gas decay time of approximately 8–16 microseconds.

Flat panel display systems, such as those disclosed in U.S. Pat. No. 4,895,149 to Buzak et al., and U.S. Pat. No. 5,077,553 to Buzak, both assigned to the assignee of the present application, use helium as the ionizable gas because of its well known beneficial properties. Specifically, pure helium decays in approximately 16–24 microseconds, depending on various physical parameters such as temperature and pressure. This decay time range is sufficient for applications such as NTSC television and VGA resolution computer monitors. The decay time of pure helium is, however, insufficient for applications requiring faster addressability times such as high definition television (HDTV), which addresses 1024 lines in 16 milliseconds.

In these prior art flat panel display systems, pure helium gas is ionized to the conductive state, i.e., becomes a mixture of charged and neutral particles, to form the electrical switch by receiving energy, in the form of electrons, from a electrode operatively associated with the helium gas. Helium gas particles decay from the ionized state to the nonionized state by recombination of helium ions with electrons in the gas or by collisions of the helium ions with the wall of the enclosed volume. As the ions recombine, the helium particles form excited neutral helium particles that further decay to form excited metastable helium particles and helium particles in the ground state.

The excited metastable helium particles cannot decay radiatively through dipole transitions but instead decay only by colliding with one another to produce helium ion-electron pairs and neutral helium atoms in the ground state with the wall of the display panel, or by higher order multi-pole transitions. Production of these helium ion-electron pairs results in a secondary ionization which keep the gas conductive, thereby lengthening the decay time. The ionized gas decay time represents the time during which the ionized gas returns to a nonionized state upon the removal of an electrode.

The decay time of the helium gas is, therefore, thought to be primarily controlled by the time-dependent density of these excited metastable helium particles in the afterglow of the initial ionization process. Shortening the decay time of the ionizable gas can be accomplished by decreasing the decay time of the excited metastable helium particles while producing fewer of the helium ion-electron pairs.

One method of shortening the decay time is to increase the diffusion rate and thereby increase the collision rate of the metastable particles. Increasing the diffusion rate entails significantly increasing the operating temperature of the liquid crystal display-a technique that is not a feasible alternative.

Another method of decreasing the decay time of the metastable particles includes adding a noble gas, such as xenon or neon, to the enclosed volume. The addition of a noble gas decreases the decay time in the following way. The addition of the noble gas decreases the density of the helium particles that form in the metastable state and thereby decreases the overall decay time of the ionizable gas mixture because it contains fewer metastable particles that must decay than does a pure helium ionized gas having the same number of particles.

The method of adding a noble gas to the ionizable gas suffers from several disadvantages. First, decreasing the density of the ionizable gas in the enclosed volume may decrease the effectiveness of the ionizable gas to act as an electrical switch. Second, collisions between the metastable particles and the noble gas occur relatively slowly because the metastable particles are not collisionally matched, i.e., they do not have similar energy levels that facilitate ease of collision. Third, all noble gases have their own metastable states. Collisions between two metastable particles of the added noble gas may also result in the formation of an ion-electron pair; thus the secondary ionization in the channel continues. Fourth, the addition of a noble gas does not significantly reduce the number of collisions between helium metastable particles that form ion-electron pairs resulting in secondary ionization.

There is a need, therefore, to accelerate the decay time of the metastables without producing free charge in the form of ion-electron pairs.

SUMMARY OF THE INVENTION

An object of this invention is, therefore, to provide an apparatus and a method that employs an ionizable gaseous mixture having a decreased decay time to address a data storage element so that data can be read into or retrieved from it.

Another object of this invention is to provide a flat panel display system with high-speed addressing capabilities.

A further object of this invention is to provide such a display system in which an electro-optic material cooperates with an ionizable gaseous mixture having a decreased decay time to form addressable data storage elements.

Yet another object of this invention is to provide a method of decreasing the switching time between ionized and nonionized states of an ionizable gaseous mixture by decreasing the decay time of excited metastable particles produced during return of the gas to the nonionized state while preventing the formation of ion-electron pairs that would result in a secondary ionization process.

The present invention relates to an apparatus for and methods of addressing data elements with the use of an ionizable gaseous mixture that preferably includes at least two components—an ionizable gaseous medium component, such as helium particles, and a collisionally matched particle component, such as singly ionized carbon particles. The ionizable gaseous mixture in an energized state functions as an electrical switch for addressing the data elements. The invention is described herein only by way of example with reference to two embodiments.

The first embodiment comprises an addressing structure implemented in a high resolution flat panel display system that can be used in either direct view or projection applications. The display system includes a display panel having a display surface formed of an array of data storage or display elements distributed throughout the viewing area. Each of the display elements comprises a localized volume of an ionizable gaseous mixture having a decreased decay time, such as a mixture of helium and carbon, and an electro-optic material, such as a nematic liquid crystal, that cooperate to modulate externally generated light propagating through the region of the electro-optic material where the display element is located.

The second embodiment comprises an addressing structure implemented as part of a memory device into which and out of which analog information can be, respectively, electronically written or electronically read. The memory device includes an array of data storage or memory elements each of which includes a localized volume of ionizable gaseous mixture having an accelerated decay time, such as helium and carbon, and a dielectric material, such as glass, plastic, or photoconductor. The ionizable gaseous mixture and dielectric material cooperate to provide a way of addressing the memory element to read out a signal previously developed across the memory element, irrespective of the manner in which it acquired the signal.

The storage elements are arranged in columns and rows for both embodiments. In the first embodiment, a row represents one line of video information or data, and in the second embodiment, a row represents a set of discrete quantities of analog information or data. (The information addressed in either embodiment is hereafter referred to as "data.") The columns receive the data, and a data strobe circuit addresses the columns row by row in a row scan fashion.

Either the display panel of the first embodiment or the memory device of the second embodiment comprises first and second spaced-apart substrates positioned face-to-face to each other. Multiple nonoverlapping electrical conductors extending generally in a first direction along the inner surface of the first substrate form column electrodes for data drive signals applied to them. Multiple nonoverlapping channels inscribed into the inner surface of the second substrate extend along the inner surface in a direction generally transverse to the first direction. The first and second directions preferably align with the vertical and horizontal directions, respectively. A reference potential electrode and a row electrode electrically isolated from each other extend along the length of the interior of each channel and receive data strobe signals applied between them. Each of the channels is filled with the ionizable gaseous mixture having an accelerated decay time.

In the display panel of the first embodiment, a layer of material having electro-optical properties and a layer of dielectric material are positioned between the inner surfaces of the first and second substrates, the layer of dielectric material covering the channels to form a barrier between the layer of the electro-optic material and the ionizable gas. The display elements are defined by the overlapping areas of the column electrodes and the channels and appear as spots on the display screen. The spots preferably are sufficiently small and positioned close to one another so that they are indistinguishable by an observer during normal viewing conditions.

The display panel is configured as described above so that for each display element, the ionizable gaseous mixture functions as an electrical switch that changes between a conducting or plasma state and a nonconducting or nonionized state in response to an applied data strobe signal. The magnitude of the data drive signal on the column electrodes corresponds to the luminance of a display image.

Whenever it is in the conducting state, a region of ionized gaseous mixture allows a data voltage of a magnitude representing that of a data drive signal to develop across the liquid crystal material in a region spatially aligned with the region of ionized gaseous mixture. Whenever it changes to the nonconducting state, the region of nonionized gaseous mixture allows the spatially aligned region of liquid crystal material to hold the data voltage across it for a time. The ionizable gaseous mixture functions, therefore, to select and store data across the liquid material and thereby provide a display system having gray scale capability.

Switching the ionizable gaseous mixture between the conducting state and the nonconducting state in the display panel modulates the light transmission through a display element. The modulation of light transmission depends on the magnitude of the applied data drive signal. A monochrome or black-and-white display system with gray scale luminance qualities can be implemented with the use of the display panel. A full color display system with controllable color intensity can be implemented by positioning within the black-and-white display system a color filter containing groups of spots in three primary colors spatially aligned with the display elements. A group of three display elements spatially aligned with the group of spots would, therefore, represent one image pixel whose color is determined by the relative intensities of the spots in the group.

The display system of the present invention is capable of rendering fully dynamic, gray scale images over a broad range of field rates to provide a quality display. The display system is especially advantageous because it is of simple, rugged construction and is capable of addressing at least 3,000 lines of data at 60 Hz field rates on the display screen.

In the memory device of the second embodiment, only a layer of dielectric material is positioned between the first and second substrates. The memory elements are defined by the overlapping areas of the column electrodes and the channels. The memory device is configured as described above so that for each memory element, the ionizable gaseous mixture functions as an electrical switch that changes between the ionized conducting state and the nonionized nonconducting state in response to the applied data strobe signal. Amplifiers providing the data drive signals are configured as column electrode drive amplifiers in a data write mode and as column electrode sensing amplifiers in a data read mode.

Whenever it is in the conducting state, a region of ionized gaseous mixture allows a data voltage of a magnitude representing that of a data drive signal to develop across the dielectric material in a region spatially aligned with the region of ionized gaseous mixture. Whenever it changes to the nonconducting state, the region of nonionized gaseous mixture allows the spatially aligned dielectric material to hold the data voltage across it for a time. The column electrode sensing amplifier associated with the region applies a reference voltage to a surface of the layer of dielectric material opposite the surface spatially aligned with the region of ionized gaseous mixture. Whenever it returns to the conducting state, the region of ionized gaseous mixture causes a change in the voltage across the dielectric material which change is proportional to the previously written data voltage and appears at the output of the column electrode sensing amplifier. This represents the data read mode of the memory device.

The ionizable gaseous mixture switches from the conductive state to the nonconductive state by an accelerated decay process resulting from the mixture of collisionally matched particles, such as carbon, and ionizable gaseous medium particles, such as helium. The ionizable gaseous mixture switches between the conductive state and the nonconductive state as a result of all of its components' recombining or collisionally decaying to neutral particles. The gas particles are ionized to the conductive lo state to form the electrical switch by receiving energy in the form of electrons from an electrode communicating with the gas. The gas then decays from the ionized state to the nonionized state by recombination of the ions with electrons in the gas or by collisions with walls of the enclosed volume. The excited neutral helium particles that are formed during recombination can then decay to form excited helium metastable particles. These metastable particles are undesirable because they can collide to form ion-electron pairs that result in a secondary ionization that effectively lengthens the decay time. To avoid this undesirable reaction, collisionally matched particles are included in the gas mixture.

Each of the excited helium particles contains a 1s2p energy level that is collisionally matched with a $2s^2 4f$ energy level of a singly ionized carbon particle contained within the gas mixture. As a result of the collisionally matched energy levels, the excited helium particles and the singly ionized carbon particles easily collide to transfer the energy from the helium to the carbon, thus preventing the decay of the helium particle involved in the collision to the metastable state. The resulting excited carbon particles quickly decay radiatively to states that will also recombine quickly, thus removing energy from the ionizable gaseous mixture without the formation of additional free charge in the form of helium ion-electron pairs.

Additional objects and advantages of the present invention will be apparent from the detailed description of preferred embodiments thereof, which proceeds with reference to the accompanying drawings.

BRIEF DESCRIPTION OF THE DRAWINGS

FIG. 1 is a diagram showing a frontal view of the display surface of a display panel and associated drive circuitry of a display system embodying the present invention.

FIG. 3 is an enlarged fragmentary frontal view with portions broken away to show different depthwise views of the interior of the display panel of FIG. 2.

FIG. 4 is an enlarged sectional view taken along lines 4—4 of FIG. 3.

FIG. 5 is an enlarged sectional view taken along lines 5—5 of FIG. 3.

DETAILED DESCRIPTION OF PREFERRED EMBODIMENTS

Figure 2:
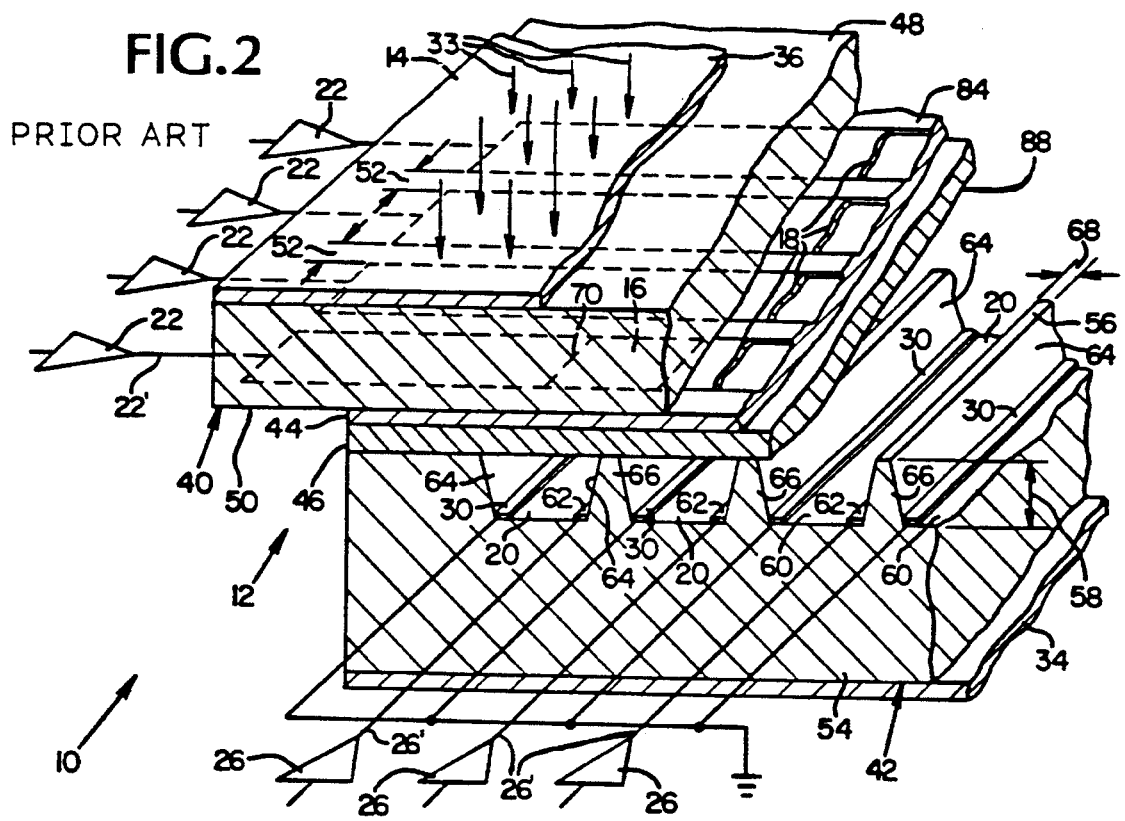
FIG. 2 is an enlarged fragmentary isometric view showing the layers of structural components forming the display panel embodying the present invention as viewed from the left side in FIG. 1.

FIG. 1 shows a fiat panel display system 10, which represents a first embodiment that implements the addressing structure and carries out the addressing method of the present invention. With reference to FIG. 1, fiat panel display system 10 comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to as "column electrodes 18.") The display elements 16 in each of the rows of channels 20 represent one line of data.

The widths of column electrodes 18 and channels 20 determine the dimensions of display elements 16, which are of rectangular shape. Column electrodes 18 are deposited on a major surface of a first electrically nonconductive, optically transparent substrate, and channels 20 are inscribed in a major surface of a second electrically nonconductive, optically transparent substrate, as will be further described below. Skilled persons will appreciate that certain systems, such as a reflective display of either the direct view or projection type, would require that only one of the substrates be optically transparent.

Column electrodes 18 receive data drive signals of the analog voltage type developed on parallel output conductors 22' by different ones of the output amplifiers 22 (FIGS. 2–6) of a data driver or drive circuit 24, and channels 20 receive data strobe signals of the voltage pulse type developed on parallel output conductors 26' by different ones of the output amplifiers 26 (FIGS. 2–6) of a data strobe or strobe means of strobe circuit 28. Each of the channels 20 includes a reference electrode 30 FIG. 2) to which a reference potential common to each channel 20 and data strobe 28 is applied.

To synthesize an image on the entire area of display surface 24, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such a material that changes the polarization state of incident light rays 33, display panel 12 is positioned between a pair of light polarizing filters 34 and 36 (FIG. 2), which cooperate with display panel 12 to change the luminance of light propagating through them. The use of a scattering liquid crystal cell as the electro-optic material would not require the use of polarizing filters 34 and 36, however. A color filter (not shown) may be positioned within display panel 12 to develop multi-colored images of controllable color intensity. For a projection display, color can also be achieved by using three separate monochrome panels 10, each of which controls one primary color.

With reference to FIGS. 2–5, display panel 12 comprises an addressing structure that includes a pair of generally parallel electrode structures 40 and 42 spaced apart by a layer 44 of electro-optic material, such as a nematic liquid crystal, and a thin layer 46 of a dielectric material, such as glass, mica, or plastic. Electrode structure 40 comprises a glass dielectric substrate 48 that has deposited on its inner surface 50 column electrodes 18 of indium tin oxide, which is optically transparent, to form a striped pattern. Adjacent pairs of column electrodes 18 are spaced apart a distance 52, which defines the horizontal space between next adjacent display elements 16 in a row.

Electrode structure 42 comprises a glass dielectric substrate 54 into whose inner surface 56 multiple channels 20 of rounded trapezoidal cross section are inscribed. Channels 20 have a depth 58 measured from inner surface 56 to a base portion 60. Each one of the channels 20 has a pair of thin, electrodes of various compositions and surface coatings 30 and 62 extending along base portion 60 and a pair of inner side walls 64 diverging in the direction away from base portion 60 toward inner surface 56. The reference electrodes 30 of the channels 20 are connected to a common electrical reference potential, which can be fixed at ground potential as shown. The electrodes 62 of the channels 20 are connected to different ones of the output amplifiers 26 (of which three and five are shown in FIG. 2 and FIG. 3, respectively) of data strobe 28. (The electrodes 62 are hereinafter referred to as "row electrodes 62.") To ensure proper operation of the addressing structure, the reference electrodes 30 and row electrodes 62 preferably are connected to the electrical reference potentials and the outputs 26' of data strobe 28, respectively, on opposite sides of display panel 10.

The sidewalls 64 between adjacent channels 20 define a plurality of support structures 66 whose top surfaces 56 support layer 46 of dielectric material. Adjacent ones of channels 20 are spaced apart by the width 68 of the top portion of each support structure 66, which width 68 defines the vertical space between next adjacent display elements 16 in a column. The overlapping regions 70 of column electrodes 18 and channels 20 dimensions of display elements 16, which are shown in dashed lines in FIGS. 2 and 3. FIG. 3 shows with better clarity the array of display elements 16 and the vertical and horizontal spacings between them.

The magnitude of the voltage applied to column electrodes 18 specifies the distance 52 to promote isolation of adjacent column electrodes 18. Distance 52 is typically much less than the width of column electrodes 18. The inclinations of the side walls 64 between adjacent channels 20 specify the distance 68, which is typically much less than the width of channels 20. The widths of the column electrodes 18 and the channels 20 are typically the same and are a function of the desired image resolution, which is specified by the display application. It is desirable to make distances 52 and 68 as small as possible. In current models of display panel 12, the channel depth 58 is less than or equal to one-half the channel width.

Each of the channels 20 is filled with an ionizable gaseous mixture, preferably one that includes helium, for reasons that will be explained below. Layer 46 of dielectric material functions as an isolating barrier between the ionizable gaseous mixture contained within channel 20 and layer 44 of liquid crystal material. The absence of dielectric layer 46 would permit either the liquid crystal material to flow into the channel 20 or the ionizable gaseous mixture to contaminate the liquid crystal material, however. Dielectric layer 46 may be eliminated from displays that employ a solid or encapsulated electro-optic material.

Figure 6:
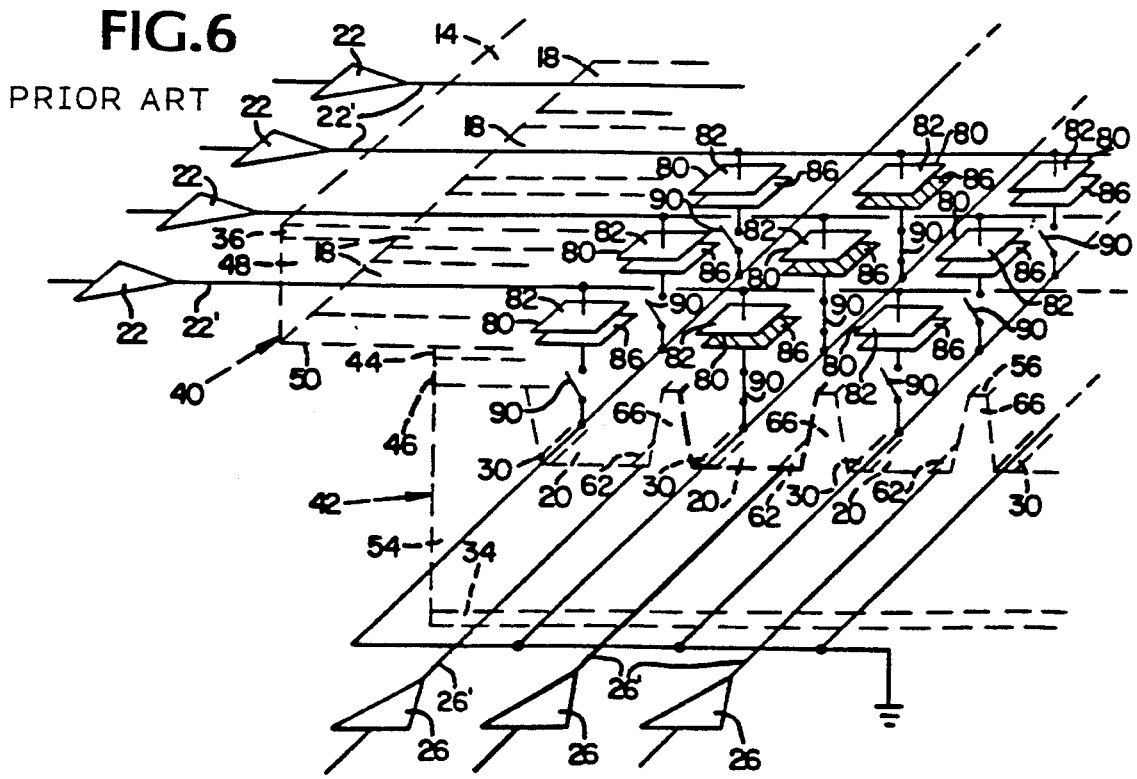
FIG. 6 is an equivalent circuit showing for a display system the operation of the ionizable gas as a switch for an exemplary row receiving data strobe pulse and three exemplar data columns receiving a data drive signal.

The principles underlying the operation of display panel 12 are that (1) each of its display elements 16 functions as a sampling capacitor for analog voltage data applied to the column electrode 18 forming a part of the display element and (2) the ionizable gas functions as a sampling switch. FIG. 6 is an equivalent circuit to which the following explanation of the operation of display system 10 refers.

With reference to FIG. 6, each of display elements 16 of display panel 12 can be modeled as a capacitor 80 (hereinafter "capacitor model 80"), whose top plate 82 represents one of the column electrodes 18 (FIG. 2) and whose bottom plate 86 represents the free surface 88 (FIG. 2) of layer 46 of the dielectric material. Capacitor model 80 represents the capacitive liquid crystal cell formed by an overlapping region of a column electrode 18 and a channel 20. The description herein of the operation of display system 10 refers to the capacitor model 80.

In accordance with the basic addressing procedure, data driver 24 captures a first line of data, which represents discrete samples of the time-varying voltage of analog data signal in a time interval of predetermined duration. The sample of the magnitude of the data signal at a particular instance within the time interval represents the magnitude of the analog voltage applied to a capacitor model 80 in a corresponding column position of the row electrode 62 receiving a strobe pulse. Data driver 24 develops on its output conductors 22 the analog voltages that are applied to column electrodes 18. In FIG. 6, four exemplary output amplifiers 22 of data driver 24 deliver analog voltages of positive polarity with respect to reference electrode 30 to the respective ones of column electrodes 18 to which they are connected. The application of a positive voltage on a column electrode 18 induces on free surface 88 (FIG. 2) of layer 46 of the dielectric material a voltage that is essentially equal to the magnitude of the applied voltage. This causes no change in the potential difference across capacitor model 80 and is represented in FIG. 6 by a top plate 82 and a bottom plate 86 with white surfaces.

In this instance, the gaseous mixture contained in channel 20 is in a nonionized (i.e. becomes a plasma) and the analog voltage developed on plates 82 and 86 of capacitor model 80 is positive with respect to the voltage potential of reference electrode 30 in the channel. Whenever data strobe 28 develops a negative-going voltage pulse on the row electrode 62 positioned within channel 20, the ionizable gaseous mixture in channel 20 assumes an ionized state (i.e., becomes a plasma). The channel 20 whose row electrode receives the strobe pulse is represented in FIG. 6 in dark, thick lines. Under these conditions, the grounded reference electrode 30 and the strobed row electrode 62 function as an anode and a cathode, respectively, for the ionized gas contained within the channel.

The electrons in the ionized gas neutralize the induced positive voltage on the bottom plates 86 of capacitor models 80. The capacitor models 80 in the strobed row are enlarged with the data voltages applied across them. This condition is indicated in FIG. 6 by top plates 82 with white surfaces and bottom plates 86 with lined surfaces. Upon completion of the storage of the data voltages across capacitor models 80, data strobe 28 terminates the negative-going voltage pulse on the row electrode 62 of the strobed channel 20, thereby ending the strobe pulse and extinguishing the ionized gas.

Each of the row electrodes 62 is strobed in a similar manner until the entire display surface 14 is completely addressed and thereby stores an image field of data. The voltage remains stored across each of the capacitor models 80 in the strobed row for a time at least as long as the duration of the image field and is independent of subsequent changes in data voltage applied to top plate 82 of capacitor model 80. The voltage stored across each of the capacitor models 80 changes in accordance with the analog data voltages representing the display data of the next succeeding image field.

In a display system 10 whose image files are in a noninterlaced format, the analog data voltages applied to column electrodes 18 in the next succeeding image field are of opposite polarity. Alternating between positive and negative polarities from one image field to the next image field provides a long term zero net DC voltage component, which is typically required for long term operation of liquid crystal materials. The liquid crystal material produces the gray scale effect in response to the root-mean-square (rms) value of the applied analog voltage data. The display image produced is, therefore, unaffected by alternate changes in polarity of the analog voltage data. In a display system 10 whose image fields are in an interlaced format, the analog data voltages applied to column 18 electrodes in next succeeding image frames are of opposite polarity to achieve the long term zero net DC voltage component. Each image frame includes two image fields of which each comprises one-half the number of addressable lines.

The description presented above indicates that the ionizable gaseous mixture contained within each of the channels 20 operates as an electrical switch 90 whose contact position changes between binary switching states as a function of the voltage applied by data strobe 28. The switches 90 shown in FIG. 6 in the open position are connected to reference electrodes 30 and are driven by a strobe pulse applied to row electrodes 62. The absence of a strobe pulse allows the ionizable gaseous mixture within the channels 20 to be in a nonionized state and thereby be in a nonconducting state. The switches 90 shown in FIG. 6 in the closed position are connected to a reference electrode 30 and are driven by a strobe pulse that is applied to row electrode 64 and is of a magnitude that causes the ionizable gaseous mixture within channel 20 to be in an ionized state and thereby be in a conducting state. In FIG. 6, the amplifier 26 shown in the middle of the three output amplifiers 26 of data strobe 28 strobes a row of capacitor models 80 to establish and store the display data voltages across them.

To function as a switch, the ionizable gaseous mixture contained within channels 20 beneath electrode structure 40 communicates with layer 46 of the dielectric material to provide an electrically conductive path from layer 46 of the dielectric material to provide an electrically conductive path from layer 46 of the dielectric material to reference electrode 30. The ionized gas in a channel 20 whose row electrode 62 receives a strobe pulse provides a ground path to the capacitor model 80 representing the portion of liquid crystal material positioned adjacent the ionized gas. This allows the capacitor models 80 to sample the analog data voltages applied to column electrodes 18. Extinguishing the ionized gas acts to remove the conducting path, thereby allowing the data sample to be held across the display element. The electron current in an ionized gas flows from the cathode (row electrode 62) to the anode (reference electrode 30). The voltages remain stored across layer 44 of the liquid crystal material until voltages representing a new line of data in a subsequent image field are developed across the layer 44. The above-described addressing structure and technique provide signals of essentially 100% duty cycle to every one of the display elements 16.

Figure 7:
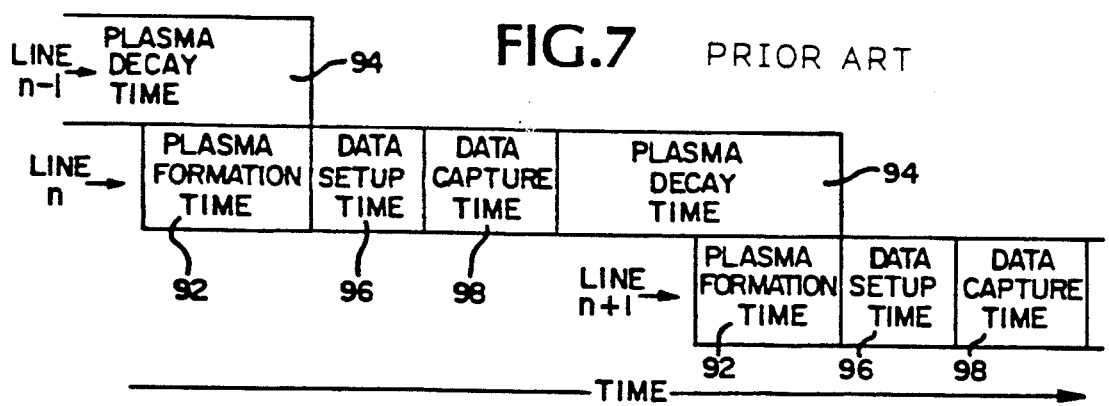
FIG. 7 is a diagram showing the various time constraints that determine the maximum number of lines of data that are addressable by a display system embodying the present invention.

FIG. 7 is a diagram showing the time constraints that limit the number of lines of data of which display system 10 is capable of addressing during an image field. With reference to FIG. 7, an exemplary line "n" of data requires time 92 for the ionized gas to form after the row of electrodes 62 of the strobed channel 20 receives a strobe pulse. The ionized gas formation time 92 may be substantially eliminated as a factor in limiting the number of addressable lines in an image field by initiating the strobe pulse in advance during the preceding line n-1. In the preferred embodiment, the ionized gas formation time 92 for helium gas is nominally 3.0 microseconds.

The data setup time 96 represents the time during which data driver 24 slews between the data values of two next adjacent lines of data and develops on output amplifiers 22 the analog voltage signals that are applied to column electrodes 18. The data setup time 96 is a function of the electronic circuitry used to implement data driver 24. A data setup time 96 of less than 1.0 microsecond is achievable.

Figure 8:
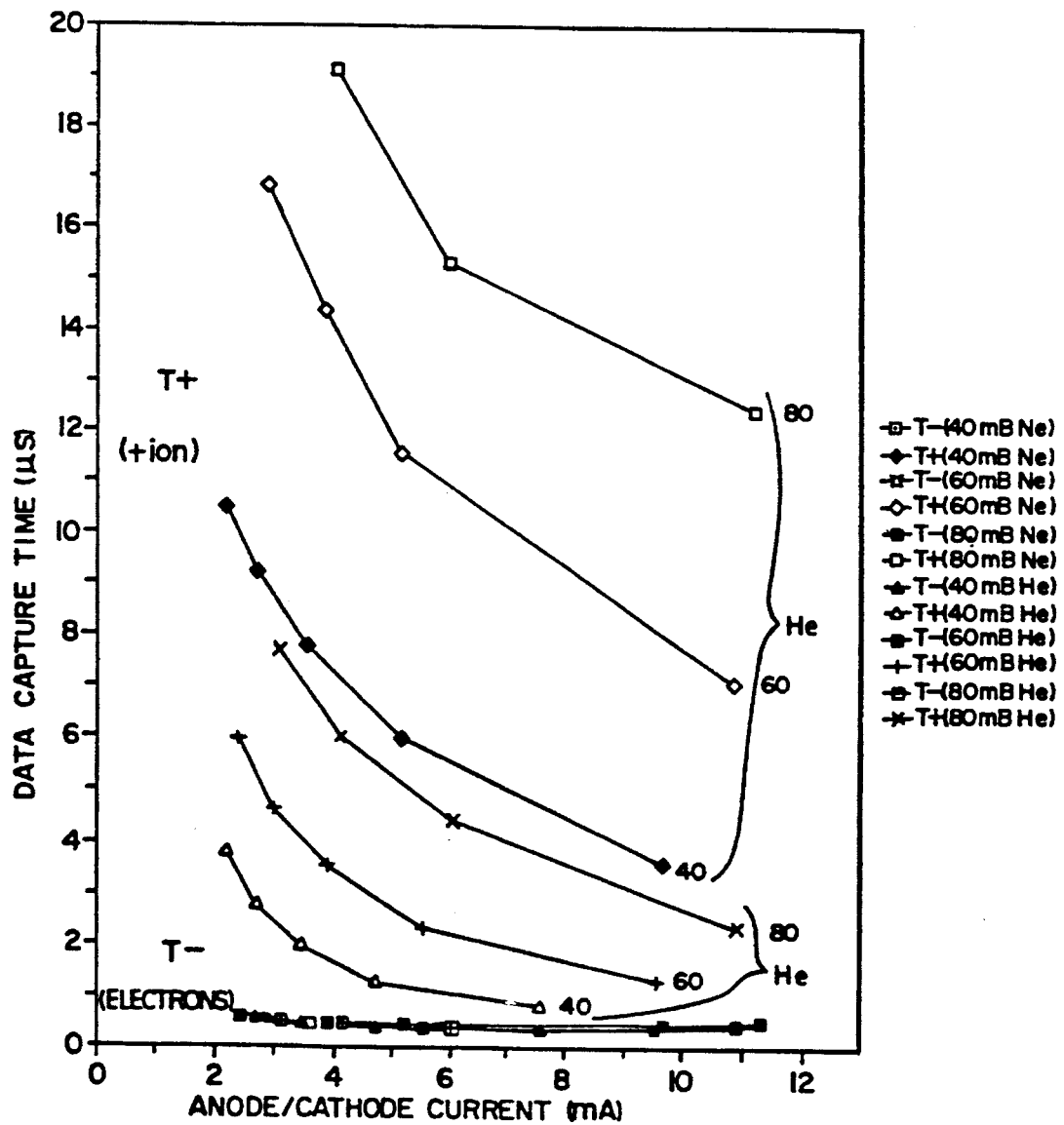
FIG. 8 is a graph showing the comparative relationship of the data capture times of neon gas and helium gas as a function of the current flowing between the electrodes positioned within the channels of the display panel of FIGS. 2–5.

The data capture time 98 depends on the conductivity of the ionizable gaseous mixture contained within the channels 20. FIG. 8 is a graph showing the time for data capture 98 as a function of the plasma current flowing between reference electrode 30 and row electrode 62 in a channel 20. The curves in FIG. 8 represent the time required by a display element to acquire 90% of the voltage corresponding to a datum. FIG. 8 shows that the ions produced by a plasma comprised of pure helium gas exhibit a lower data capture time 98 than that of neon. The electron current in a plasma flows from the cathode (row electrode 62) to the anode (reference electrode 30).

A preferred operating point is that which provides the fastest data capture time 98 for positive ion current. In the particular case represented in FIG. 8, such an operating point can be achieved by using helium gas at a pressure of 40 millibars and a current of 7.5 milliamperes to produce a time 98 for data capture of about 0.5 microsecond. The reason helium provides a shorter data capture time 98 than that of neon is that helium is a lighter ion with greater mobility. Optimum values of pressure and current depend on the size and shape of channels 20.

Figure 9:
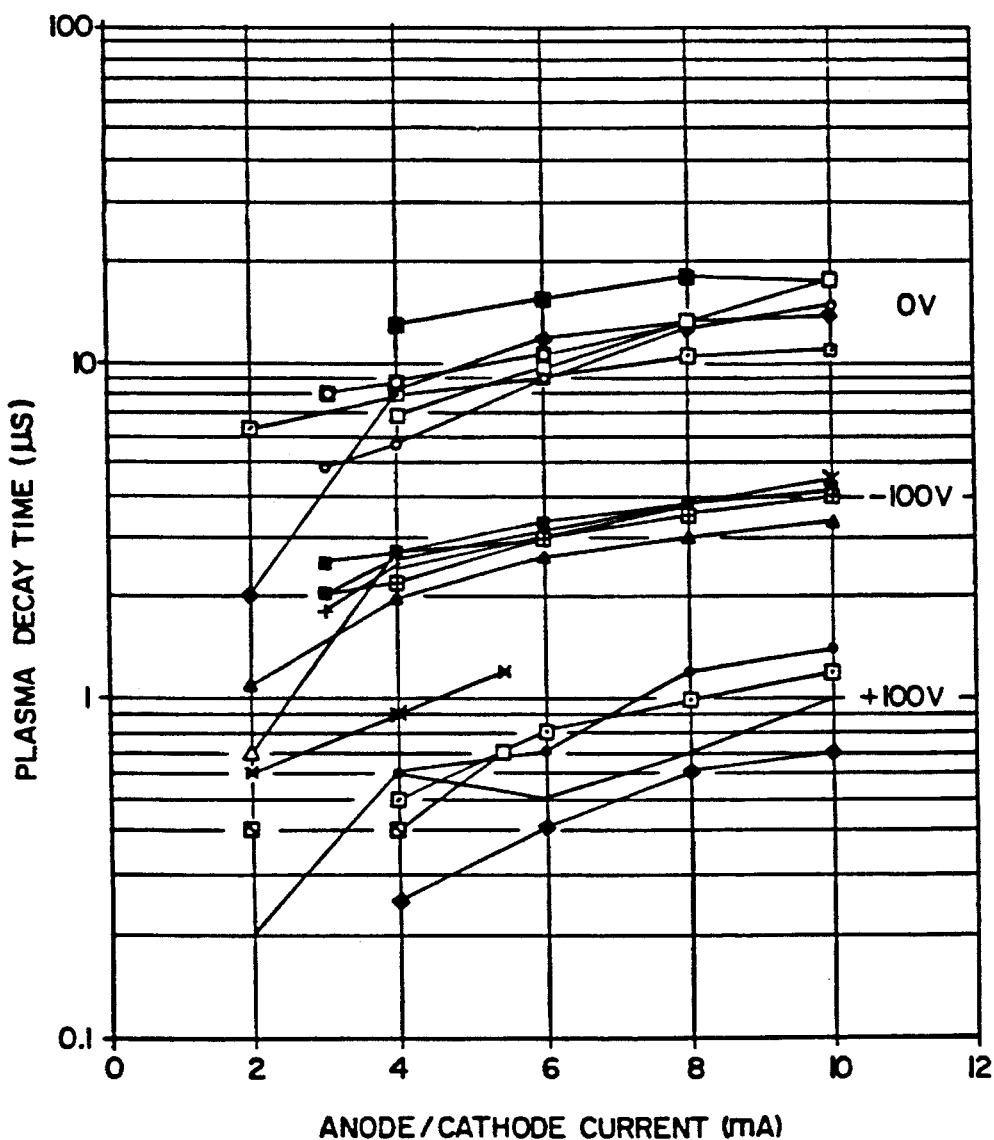
FIG. 9 is a graph showing for data strobe pulses of different magnitudes the ionizable gas decay times for pure helium gas as a function of the current that was flowing during the strobe pulse between the electrodes positioned within the channels of the display panel of FIGS. 2–5.

The ionized gas decay time 94 represents the time during which the ionized gas in channel 20 returns to a nonionized state upon the removal of a strobe pulse from row electrode 62. FIG. 9 is a graph showing the plasma decay time beyond which no greater than 3% crosstalk will occur as a function of anode/cathode current in display panel 12. FIG. 9 shows that the plasma decay time 94 increases as a function of the current flowing through the plasma from row electrode 62 to reference electrode 30. The magnitude of the strobe pulse applied to row conductor 62 determines the mount of current flowing through the plasma. FIG. 9 indicates that decreased plasma decay times 94 can be achieved by applying a continuous gas voltage of about +100 volts, which is less than the voltage required to maintain the helium gas in its ionized state. FIG. 9 also indicates that a bias voltage of +100 volts would provide approximately a tenfold decrease in ionized gas decay time 94 relative to a bias voltage of zero volts.

The time required to address a line of data equals the sum of the data setup time 96, the data capture time 98, and the ionized gas decay time 94. The number of lines addressable during an image field equals the time duration of the image field divided by the time required to address a line of data. For noninterlaced 60 Hz frame rate applications, the number of lines of data display system 10 would appear to be capable of addressing exceeds 3,000 lines using the above-described simple addressing technique. It will be appreciated that the number of addressable lines of data is not the same as the resolution of display system 10. The resolution is a function of the widths of the channels 20 and the widths of the column electrodes 18.

The use of a priming technique is advantageous to ensure the ability to address a relatively large number of lines in an image frame. Priming entails the introduction of ions to initiate a gas discharge. Priming of display system 10 can be accomplished by passing a current through a priming channel (not shown) which is orthogonally disposed to the channels 20 and in which each of the channels 20 terminates along one of the margins of display panel 12. Priming allows plasma formation without an initial statistical delay time that would otherwise unpredictably lengthen the plasma formation time.

Figure 10:
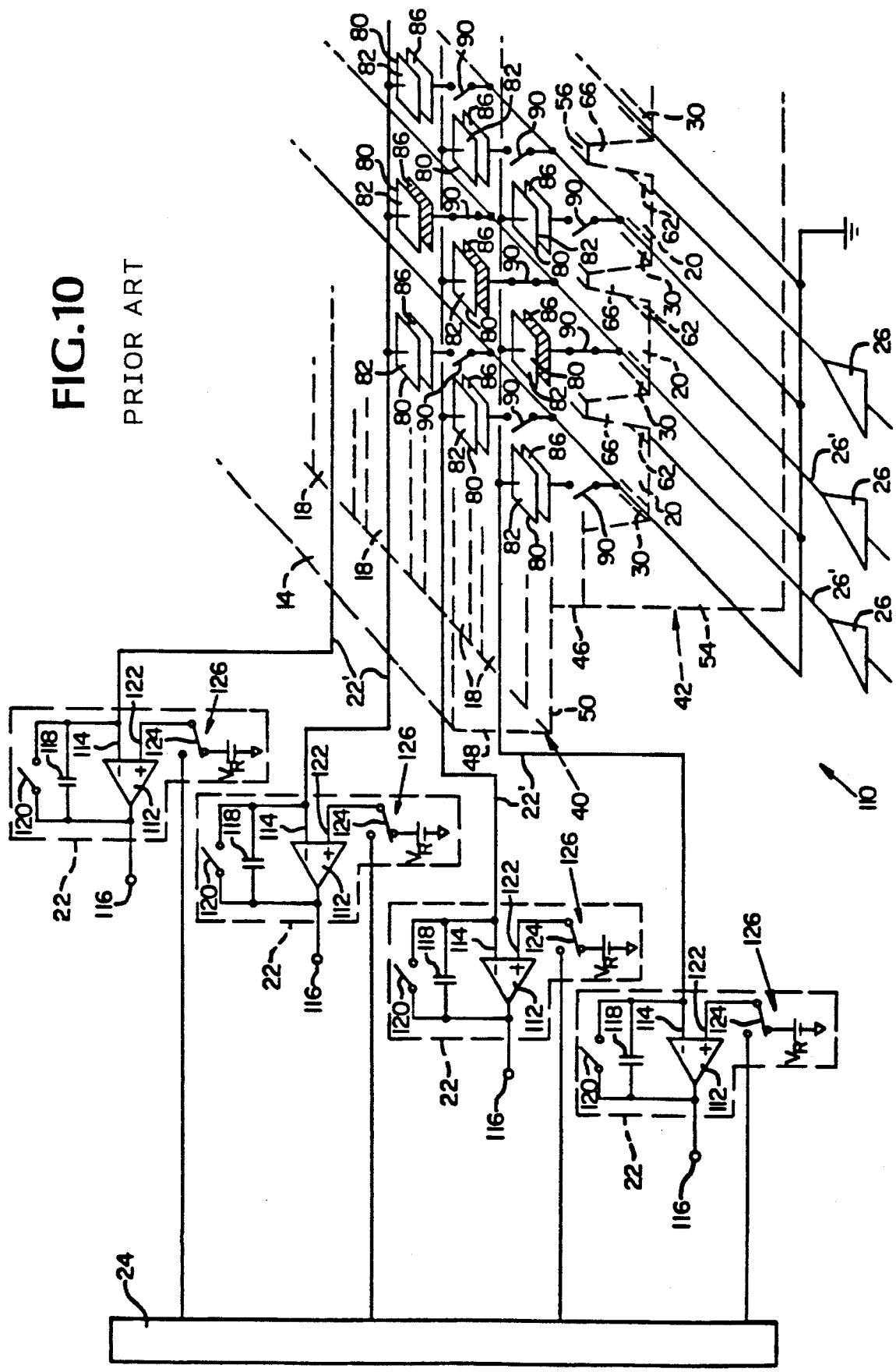
FIG. 10 is an equivalent circuit showing the operation of the ionizable gas as an electrical switch in cooperation with the data drive circuit to form an addressing structure for selectively writing data into and reading data out of a memory element.

FIG. 10 shows the equivalent circuit for memory system 110. Except as indicated above, the systems of FIGS. 6 and 10 are similar, therefore, corresponding components in FIGS. 6 and 10 bear identical reference numerals. In memory system 110, dielectric 46 functions as the dielectric element of capacitor model 80, which represents a memory element. It will be appreciated that column electrodes 18 need not be formed of optically transparent material and may advantageously be formed of aluminum or other conductive material. The data drive output amplifiers 22 of memory system 110 comprise circuit elements that function as column electrode drive amplifiers in the data write mode and as column electrode sensing amplifiers in the data read mode. The data strobe output amplifiers 26 of the system of FIGS. 6 and 10 are similar.

With reference to FIG. 10, each of the output amplifiers 22 of data drive circuit 24 comprises a high-speed operational amplifier 112 that has connected between its inverting input terminal 114 and output terminal 116 a parallel combination including a feedback capacitor 118 and a switch element 120. Amplifier 112 is selectively configured as a voltage follower in the data write mode by actuating switch element 120 to its conducting state and as an integrator in the data read mode by actuating switch element 120 to its nonconducting state. The noninverting input terminal 122 of operational amplifier 112 is connected to the movable contact terminal 124 of a switch element 126, which selectively connects noninverting input terminal 122 to either a reference voltage $V_R$ or an output signal conductor of data drive circuit 24.

Whenever it is in the data write mode, output amplifier 22 delivers a data drive signal to the column electrode 18 forming a memory element of memory system 110. This is accomplished by configuring operational amplifier 112 as a voltage follower and positioning moveable contact terminal 124 of switch element 126 to deliver the data drive signal from data drive circuit 24 to noninverting input terminal 122 of operational amplifier 112. During this time, a row strobe pulse applied to row electrode 62 in the channel 20 forming the memory element 110 excites the ionizable gaseous mixture contained in the channel to the ionized state, thereby developing a data voltage across capacitor model 80 in the manner as described above with reference to FIG. 6. The magnitude of the voltage across capacitor model 80 represents that of the data drive signal.

Whenever it is in the data read mode, data amplifier 22 senses the current in the column electrode 18 forming the memory element of memory system 110. This is accomplished by means of a two-step process.

First, moveable contact terminal 124 of switch element 126 is positioned to deliver voltage reference $V_R$ to noninverting input terminal 122 of operational amplifier 112. During this time, the row strobe pulse is inactive to maintain the ionizable gaseous mixture in a nonionized state, thereby allowing the reference voltage $V_R$ to be established on output terminal 116 of operational amplifier 112, column electrode 18, and upper plate 82 of capacitor model 80. The voltage across feedback capacitor 118 is thereby normalized to 0.0 volts. It will be appreciated, however, that memory system 110 can be configured to operate with an offset voltage between the inputs and outputs of each operational amplifier 112.

Second, after the voltage across feedback capacitor 118 stabilizes to 0.0 volts, operational amplifier 112 is configured as an integrator whose input terminal 114 is prepared to receive the current flowing from column electrode 18. The voltage difference between lower plate 86 of capacitor model 80 and reference electrode 30 is a function of $V_R$ and the previously written data voltage across capacitor model 80. Whenever a row strobe pulse again excites the ionizable gas to its ionized state, lower plate 86 of capacitor model 80 is electrically connected to reference electrode 30, thereby changing the voltage across capacitor model 80. Operational amplifier 112 now configured as an integrator senses this change in voltage and provides on its output terminal 116 a voltage proportional to the data voltage previously developed across capacitor model 80.

FIGS. 11A–11F show the atomic reactions that detail excitation of a preferred ionizable gaseous mixture of helium and carbon components from the nonconductive state to the conductive state, and the decay process that returns the ionizable gaseous mixture to the nonconductive state. As stated earlier, the ionizable gaseous mixture switches between the conductive state and the nonconductive state as a result of all of its components' recombining or collisionally decaying to neutral particles. In comparison with prior art pure helium systems, the ionizable gaseous mixture has a decreased decay time that results from the presence in the gaseous mixture of singly ionized carbon particles that are collisionally matched with the ionizable gaseous medium helium particles.

Figure 11:
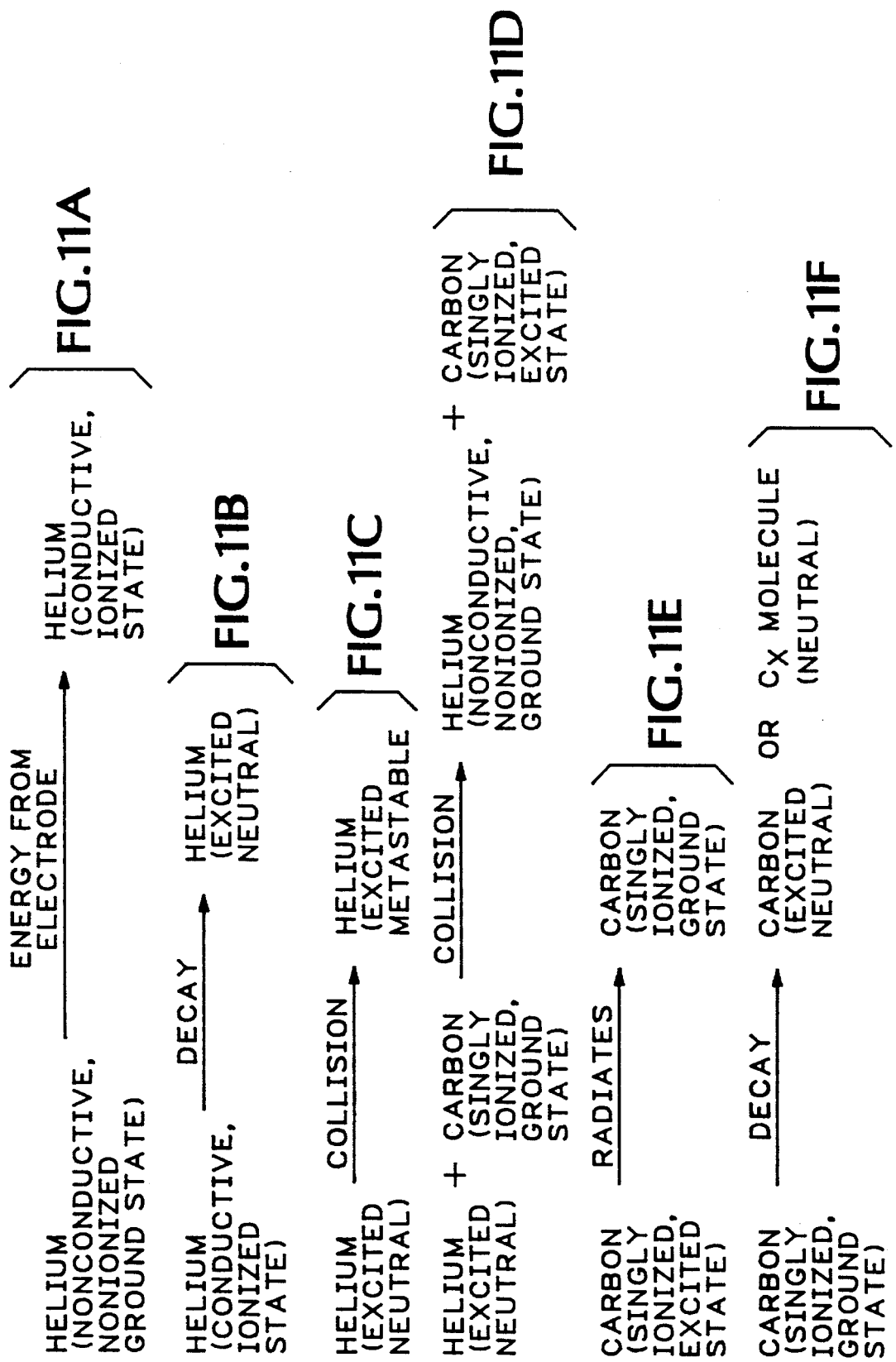
FIGS. 11A–11F show the chemical reactions that define excitation of the ionizable gaseous mixture from the nonconductive state to the conductive state and the decay process of the ionizable gaseous mixture that returns the gaseous mixture to the nonconductive state.

FIG. 11A shows the initial step of applying a voltage across electrodes 30 and 62 to provide energy in the form of electrons emitted from row electrode 62 to an ionizable gaseous medium (helium particles) in a nonconductive ground state contained within channel 20. The creation of multiple electrons in channel 20 excites a sufficient number of helium particles in the channel to a conductive state and results in the formation of an electrically conductive path, i.e., an electrical switch connection, between reference electrode 30 and row electrodes 62. FIG. 11B shows decay of the conductive helium particles through collisions with the channel walls and recombination with free electrons. Recombination forms helium particles in an excited neutral state.

FIG. 11C shows the collision of helium particles in the excited neutral state to form helium particles in an excited metastable state. Formation of these helium particles in the excited metastable state results in undesirable ion-electron pairs. To avoid the reaction shown in FIG. 11C, singly ionized carbon particles are provided so that the helium in the excited neutral state follows the reaction shown in FIG. 11D.

FIG. 11D shows decay of helium particles in the excited state by a reaction with singly ionized carbon particles in the ground state to form helium particles in the nonconductive ground state and carbon particles in an excited state. The singly ionized carbon particles are typically added to the ionizable gaseous mixture by adding to channel 20 a carbon-containing compound such as carbon monoxide, carbon dioxide, carbon tetrafluoride, methane, or carbon vapor vaporized from a carbon-containing surface. The carbon particles are mixed with the ionizable gaseous medium (helium gas) in a predetermined amount, preferably a trace amount, resulting in about a less than 10% concentration of the carbon in the ionizable gaseous mixture. The singly ionized carbon particles in the ground state readily react with the excited helium particles because they are collisionally matched, i.e., have similar energy levels, as discussed below with reference with FIG. 13.

FIG. 11E shows the decay of carbon in the excited state to carbon in the ground state by the release of energy through radiative decay. The radiative decay time of the excited carbon is approximately a few nanoseconds.

FIG. 11F shows the recombination, collision, or molecular recombination of the singly ionized carbon ions to form neutral particles. The singly ionized carbon decays by colliding with the electron at the wall of channel 20 to form a carbon in the excited neutral state. The single ionized carbon may also recombine with oxygen, hydrogen, or fluorine to form carbon monoxide, carbon dioxide, or carbon tetrafluoride (i.e., "x" of $C_x$ in FIG. 11F is O, $O_2$, $CH_4$, or $Fl_4$).

Upon completion of the reaction shown in FIG. 11F, the system is in its initial state, ready to repeat the process, with helium particles in a nonionized nonconductive state.

Figure 12:
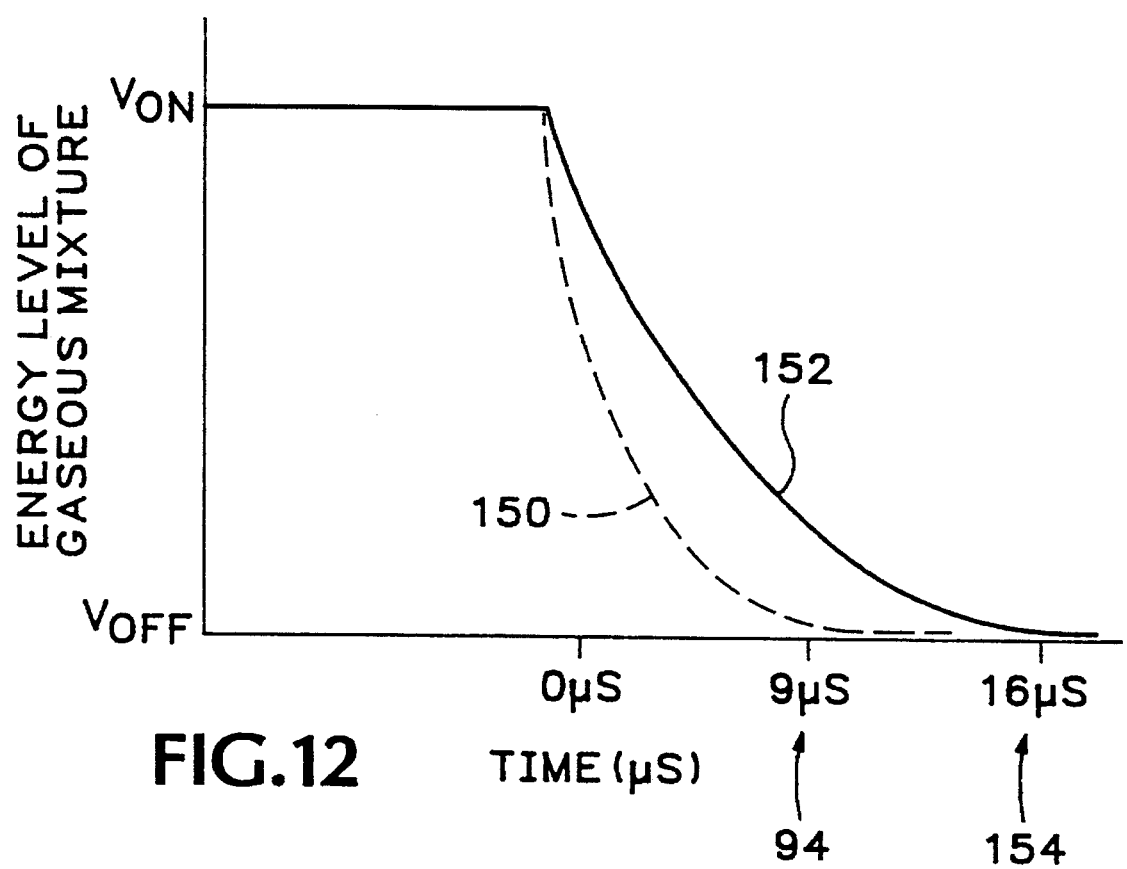
FIG. 12 shows a graph representing the decay times of pure helium gas and an ionizable gaseous mixture including helium gas and carbon gas components.

FIG. 12 shows a comparison of the decay time waveform 150 (dashed line) of a gaseous mixture of helium and carbon of the present invention with the decay time waveform 152 (solid line) of a pure helium gas. The total decay time 94 of the gaseous mixture is approximately 9 microseconds, substantially less than the approximately 16 microseconds decay time 154 of pure helium prior art systems. Gaseous mixture decay time 94 is, therefore, a shortened decay time in comparison with decay time 154 of pure helium gas. In FIG. 12, $V_{on}$ represents the conductive state of the ionizable gaseous mixture of the present invention and of the prior art pure helium system. $V_{off}$ at time=0 represents the voltage at which row electrode 62 no longer effects ionization of the ionizable gaseous mixture contained within channel 20. Total decay time 94 of the ionizable gaseous mixture and total decay time 154 of pure helium gas represent the times at which the gases are effectively nonconductive and ready for repetition of the ionization process.

Figure 13:
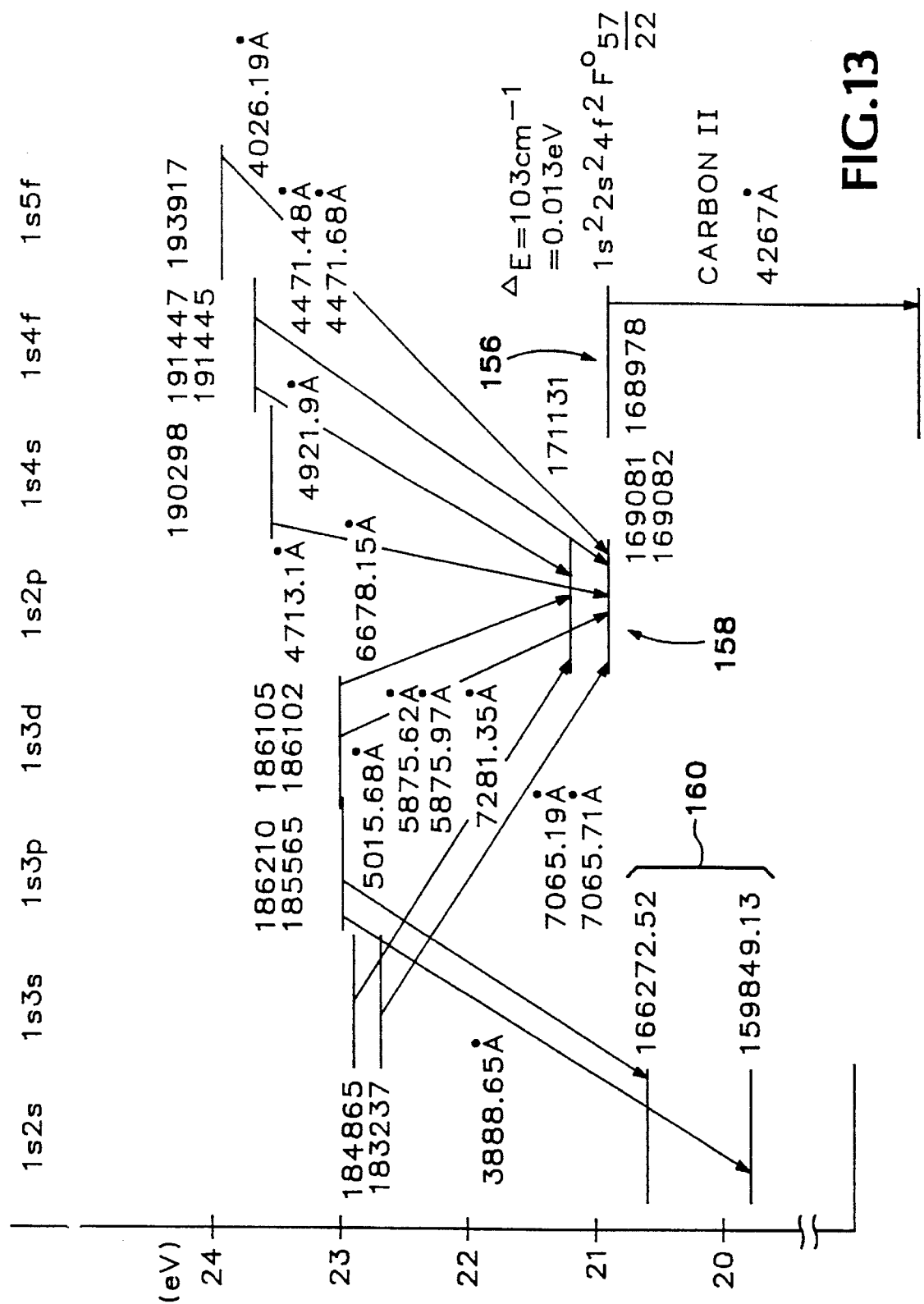
FIG. 13 shows the collisionally matched atomic levels of helium and carbon particles.

FIG. 13 shows the collisionally matched atomic levels, i.e., similar energy levels, of the carbon and helium particles. The singly ionized carbon particles have a $2s^24f$ atomic level 156 with a corresponding energy level of 168978 eV. The excited helium particles have a 1s2p atomic level 158 with a corresponding energy level of 169081 eV. These nearly resonant energy levels facilitate collisions between the helium and the carbon particles that are collisionally matched with the helium and result in a transfer of energy from the helium to the carbon. This is known because reaction cross-sections (the probability of a reaction occurring) typically have a term that is proportional to $\exp[-\Delta E/T_e]$, where $\Delta E$ is the energy separation between the levels of the two particles colliding and $T_e$ is the electron temperature. It is readily seen from this expression that the maximum reaction rate will occur for collisions where $\Delta E$ is small, as in the case for the level described herein.

As a result of energy levels 156 and 158 being collisionally matched, collisions between the helium and carbon particles occur more frequently and thus reduce the density of helium particles in the metastable states 160. The conductivity of the channel in the afterglow period is known to be dependent on the density of the undesirable helium metastable particles. The smaller the density of metastable particles, the lower the conductivity of the channel in the decay phase. Applicants believe, therefore, the number of collisions between helium metastables that produce ion-electron pairs is significantly reduced and results in a more rapid decay of the ionizable gas mixture.

It will be obvious to those having ordinary skill in the art that many changes may be made to the details of the above-described preferred embodiments of the present invention without departing from the underlying principles thereof. The scope of the present invention should, therefore, be determined only by the following claims.

We claim:

1. In an addressing structure for addressing a data element, the addressing structure including an ionizable gaseous medium in communication with an electrical reference signal and a data element that stores a data signal, and including ionizing means for selectively causing the ionizable gaseous medium to transition to an ionized state from a nonionized state to provide an interruptible electrical connection between the data element and the electrical reference to selectively address the data element, a method of decreasing the time required to return the ionizable gaseous medium to the nonionized state from the ionized state by reducing release of free electrons during the return of the ionizable gaseous medium to nonionized state, comprising:

provinding a gaseous mixture that includes the ionizable gaseous medium and a gas containing collisionally matched ionized particles in a predetermined amount; and causing the ionizing means to allow the ionizable gaseous medium to leave the ionized state and, as a consequence, to produce atomic particles of the ionizable gaseous medium in an excited state that undergo ion-atomic particle collisions with the collisionally matched ionized particles, the ion-atomic particle collisions reducing occurrences of secondary ionization-producing collisions between the atomic particles of the ionizable gaseous medium to reduce release of free electrons associated with the ion-atomic particle collisions and thereby decrease the time required to return the ionizable gaseous medium from the ionized state to the nonionized state.

2. The method of claim 1 in which the collisionally matched ionized particles include carbon particles.

3. The method of claim 1 in which the predetermined amount of the collisionally matched ionized particles is a trace amount.

4. The method of claim 1 in which the collisionally matched ionized particles are carbon particles from a carbon-containing compound taken from the group consisting essentially of carbon monoxide, carbon dioxide, carbon tetrafluoride, methane, and carbon vapor vaporized from a carbon containing surface.

5. The method of claim 1 in which the ionizable gaseous medium and the collisionally matched ionized particles each have an atomic energy level, the energy levels being nearly resonant with each other.

6. The method of claim 1 in which the ionizable gaseous medium includes helium.

7. The method of claim 6 in which the collisionally matched ionized particles include singly ionized carbon particles.

8. An addressing structure for an analog data storage element, comprising:

a gaseous mixture containing an ionizable gaseous medium and a predetermined quantity of collisionally matched ionized particles, the gaseous mixture being in communication with an analog data storage element and an electrical reference and the ionizable gaseous medium forming excited atomic particles during a decay time from an ionized state to a nonionized state, and the predetermined quantity of the collisionally matched ionized particles inducing ion-atomic particle collisions reducing occurrences of secondary ionization-producing collisions between the atomic particles of the ionizable gaseous medium to reduce release of free electrons associated with the ion-atomic particle collisions and thereby decrease the decay time required to return the ionizable gaseous medium to the nonionized state from the ionized state; and ionizing means for selectively causing the ionizable gaseous medium to transition to the ionized state from the nonionized state to provide an interruptible electrical connection between the data storage element and the electrical reference to selectively address and apply an analog datum to the analog data storage element.

9. The addressing structure of claim 8 in which the collisionally matched ionized particles include carbon particles.

10. The addressing structure of claim 8 in which the predetermined amount of the collisionally matched ionized particles is a trace amount.

11. The addressing structure of claim 8 in which the collisionally matched ionized particles are carbon particles from a carbon-containing compound taken from the group consisting essentially of carbon monoxide, carbon dioxide, carbon tetrafluoride, methane, and carbon vapor vaporized from a carbon containing surface.

12. The addressing structure of claim 8 in which the ionizable gaseous medium and the collisionally matched ionized particles each have an atomic energy level, the energy levels being nearly resonant with each other.

13. The addressing structure of claim 8 in which the gaseous medium includes helium.

14. The addressing structure of claim 8 in which the collisionally matched ionized particles include singly ionized carbon particles.

* * * * *